US012621736B2

(12) United States Patent
Hassan et al.

(10) Patent No.: US 12,621,736 B2
(45) Date of Patent: May 5, 2026

(54) METHODS AND APPARATUSES FOR RADIO COMMUNICATION

(71) Applicant: Robert Bosch GmbH, Stuttgart (DE)

(72) Inventors: Khaled Shawky Hassan, Sarstedt (DE); Maximilian Stark, Hamburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 390 days.

(21) Appl. No.: 18/194,952

(22) Filed: Apr. 3, 2023

(65) Prior Publication Data

US 2024/0334290 A1    Oct. 3, 2024

(51) Int. Cl.
| | |
|---|---|
| *H04W 36/30* | (2009.01) |
| *H04W 36/00* | (2009.01) |
| *H04W 36/36* | (2009.01) |

(52) U.S. Cl.
CPC ..... *H04W 36/304* (2023.05); *H04W 36/0055* (2013.01); *H04W 36/362* (2023.05)

(58) Field of Classification Search
CPC ........................... H04W 36/304; H04W 36/362
See application file for complete search history.

(56) References Cited

U.S. PATENT DOCUMENTS

| | | | | |
|---|---|---|---|---|
| 2022/0225181 A1* | 7/2022 | Kovacs | ............... | H04W 36/087 |
| 2022/0295338 A1* | 9/2022 | Ebrahim Rezagah | ....................... | H04W 36/362 |

| | | | | |
|---|---|---|---|---|
| 2023/0247512 A1* | 8/2023 | Hévizi | ................ | H04W 36/362 |
| | | | | 370/331 |
| 2023/0337043 A1* | 10/2023 | Pateromichelakis | ........................ | |
| | | | | H04W 28/0263 |
| 2024/0098612 A1* | 3/2024 | Xiong | .................... | H04W 36/30 |
| 2024/0334205 A1* | 10/2024 | Xiong | ................. | H04L 41/0873 |
| 2024/0365185 A1* | 10/2024 | Wu | ...................... | H04W 36/324 |

FOREIGN PATENT DOCUMENTS

| | | |
|---|---|---|
| CN | 112823544 A | 5/2021 |
| EP | 3755057 A1 | 12/2020 |
| EP | 3893548 A1 | 10/2021 |
| WO | 2020218863 A1 | 10/2020 |

OTHER PUBLICATIONS

Nokia, et al.: Baseline CR for introducing Rel-16 NR mobility enhancement, Draft, 3GPP TSG-RAN WG3 Meeting #108-e R3-204473, Jun. 24, 2020, 3rd Generation Partnership Project (3GPP), Mobile Competence Centre; 650, Route Des Lucioles; F-06921 Sophia-Antipolis Cedex, France, vol. RAN WG3, (2020), XP051905681, Retrieved from URL:https://ftp.3gpp.org/tsg_ran/ TSG_RAN/TSGR_88e/Docs/RP-201075.zip38423_CR0136r13_ (Rel-16)_R3-204473.docx. Jun. 24, 2020; pp. 1-168.

* cited by examiner

*Primary Examiner* — Barry W Taylor
(74) *Attorney, Agent, or Firm* — NORTON ROSE FULBRIGHT US LLP

(57) ABSTRACT

A method for radio communication. The method includes: receiving at least one conditional handover execution condition for conducting a conditional handover; determining at least one future QoS that characterizes a quality of at least one radio channel between a radio terminal and a radio access node for at least one future time instant; and evaluating the at least one handover condition based at least on the at least one future QoS.

14 Claims, 6 Drawing Sheets

PTI

| cell ID #1 | HO probability #A | time window  #A |
|---|---|---|
| cell ID #1 | HO probability #B | time window  #B |
| ⋮ | | |
| cell ID #N | HO probability #M | time window  #M |

METHODS AND APPARATUSES FOR RADIO COMMUNICATION

BACKGROUND INFORMATION

There are provided advances in radio communication, in particular in cellular handover technology.

In general, the QoS of a radio channel can be modeled in a stochastic manner. In turn, one can also describe analytically how specific channel characteristics vary over time and space. Nevertheless, the stochastic channel models cannot capture reality precisely which would only be possible using so-called ray tracing in simulations. Thus, the periodic monitoring of the channel is required to assess the channels.

SUMMARY

An aspect of the present invention is directed to the following subject matter:

A method comprising receiving at least one conditional handover execution condition for conducting a conditional handover; determining at least one future QoS that characterizes a quality of at least one radio channel between a radio terminal and a radio access node for at least one future time instant; and evaluating the at least one handover condition based at least on the at least one future QoS.

Advantageously, receiving the conditional handover execution condition allows a centrally managed handover actions. By injecting a predicted future QoS into the handover condition, the radio terminal is able to determine a future state of the handover situation. This forecast of QoS contributes to a reduction of actual handover actions and therefore provides means for reducing service interruptions and reduces management overhead on the side of the radio access network.

An advantageous example embodiment of the present invention includes transmitting, if the evaluated at least one handover condition indicates an expected future conditional handover from a serving cell to at least one candidate cell, a pre-trigger indication that indicates at least a probability of the expected future conditional handover.

A legacy handover, i.e., a handover specified in Rel. 16 is known to cause a notable handover interruption time. Either the measurement report from the UE might not reach the BS or the handover command does not reach the UE due to channel degradation. This induces unpredicted interruption time/failure. The transmission of the pre-trigger indication enables for the centrally managed handover that the expected future perspective of the radio terminal is taken into consideration. Interruption times can be reduced.

If multiple cells need to be prepared to further increase robustness and in the best-case scenario the mobile terminal accesses one of them, a set of resources would need to be reserved while the UE is monitoring the condition and does not perform the handover. The network therefore needs to carefully select the target candidate and keep the number of target candidate cells to a reasonable amount, especially in a resource-constrained scenario like in a high load.

Standardization supports two approaches: early data forwarding and late data forwarding. In early data forwarding, data is forwarded during the preparation phase and the main benefit is to enable similar interruption performance as legacy, while increasing robustness. In that solution, the complexity increases with the number of target candidates and the time it takes until the handover is actually performed. Late data forwarding is a simpler alternative, when data starts to be forwarded by the serving node when the UE accesses the target cell. Both, late and early data forwarding benefit as the handover is predicted.

An advantageous example embodiment of the present invention includes transmitting a reevaluation request if the at least one evaluated handover condition indicates an unfavorable future handover situation.

Advantageously, the radio terminal/UE can decide that the radio access node/gNB or another central entity should reevaluate the received handover conditions. Therefore, the UE has the obligation to decide about whether the handover conditions are reasonable from its perspective.

An advantageous example embodiment of the present invention includes: receiving, as a response to the transmitted reevaluation request, at least one further conditional handover execution condition for conducting a handover; determining at least one further future QoS for at least one further future time instant; evaluating the at least one further handover condition based at least on the at least one further future QoS;

and transmitting, if the evaluated at least one further handover condition indicates an expected future conditional handover from a serving cell to at least one candidate cell, the pre-trigger indication.

Advantageously, the reevaluation request can result in a pre-trigger if the radio access node of the radio access network adapts the conditional handover appropriately.

An advantageous example embodiment of the present invention includes: receiving, as a response to the transmitted reevaluation request, at least one cancel message that indicates to cancel the present conditional handover; and maintaining a connection to the serving cell upon reception of the cancel message.

Advantageously, situations are avoided where the radio terminal switches from the serving cell to a candidate cell and back to the previously serving cell.

An advantageous example embodiment of the present invention includes: evaluating the at least one handover condition based at least on at least one present QoS; detaching, upon the at least one handover condition is met, from the serving cell; and synchronizing, upon the at least one handover condition is met, to a target cell associated with the at least one handover condition that is met.

Advantageously, a conditional handover is conducted for which the serving cell and the target cell are prepared as the handover condition was evaluated beforehand taking into consideration the at least one future QoS.

An advantageous example embodiment of the present invention includes that the determining of the at least one future QoS comprises: determining the at least one future QoS associated with the serving cell, using at least one machine-trained model, wherein at least one present QoS that characterizes a quality of the at least one radio channel between the radio terminal and the serving radio access node for at least one present time instant and at least one motion information that characterizes a relative motion of the radio terminal to the serving radio access node is provided as an input of the at least one machine trained model, wherein the at least one future QoS associated with the serving cell is provided as an output of the at least one machine trained model.

This transfer capability of the trained model makes it possible to better assess the future channel situation of the serving cell.

An advantageous example embodiment of the present invention includes that the determining of the at least one future QoS comprises: determining the at least one future QoS associated with a candidate cell, using at least one machine-trained model, wherein at least one present QoS of the candidate cell that characterizes a quality of the at least one radio channel between the radio terminal and a candidate radio access node for at least one present time instant and at least one motion information that characterizes a relative motion of the radio terminal to the candidate radio access node is provided as an input of the at least one machine trained model, wherein the at least one future QoS associated with the candidate cell is provided as an output of the at least one machine trained model.

Through this transfer capability of the trained model, it is possible to better assess the future channel situation of the candidate cell.

An aspect of the present invention is directed to the following subject matter: An apparatus comprising receiving means (i.e., a received) to receive at least one conditional handover execution condition for conducting a conditional handover; determining means to determine at least one future QoS that characterizes a quality of at least one radio channel between a radio terminal and a radio access node for at least one future time instant; and evaluating means to evaluate the at least one handover condition based at least on the at least one future QoS.

An aspect of the present invention is directed to the following subject matter: A method comprising determining at least one conditional handover execution condition for conducting a conditional handover associated with a radio terminal; transmitting the at least one conditional handover condition; receiving a pre-trigger indication that indicates a probability of an expected future conditional handover that is associated with the at least one transmitted conditional handover condition.

By receiving the pre-trigger indication, the radio access network takes into consideration the radio situation experienced by the UE.

An advantageous example embodiment of the present invention includes re-scheduling, based on the received pre-trigger indication, radio resources; and transmitting a scheduling grant based on the re-scheduled radio resources.

Uplink and downlink transmission can be scheduled either dynamic or configured. In dynamic scheduling each transmission, i.e., each PDSCH, is scheduled and indicated individually. The configured scheduling referred to as semi persistent scheduling several PDSCH transmission can be scheduled by one control message. For both the legacy handover and conditional handover, the UE performs the handover based on external event triggers.

Considering SPS this can easily lead to a waste of resources, as downlink or uplink transmission might be configured for time instances where a handover will be performed.

Advantageously, the radio resources previously reserved for the radio terminal and subject to handover can be immediately released re-used to serve other radio terminals.

An advantageous example embodiment of the present invention includes transmitting, based on the received pre-trigger indication a preparation message to at least one primary candidate radio access node indicating that the radio terminal will probably initiate the conditional handover with the primary candidate radio access node.

Advantageously, the receiving radio access node is able to prepare the available resources for the probable handover of the radio terminal.

An advantageous example embodiment of the present invention includes transmitting, based on the received pre-trigger indication a cancel message to at least one secondary candidate radio access node indicating a cancellation of the present potential conditional handover associated with the radio terminal and the secondary candidate radio access node.

Advantageously, the receiving radio access node is able to re-schedule the resources scheduled for the handover of the radio terminal.

An advantageous example embodiment of the present invention includes determining, upon reception of a reevaluation request, at least one further conditional handover execution condition for conducting a conditional handover associated with the radio terminal; and transmitting the at least one further conditional handover condition.

Advantageously, the future handover situation can be refined by re-determining the conditional handover condition.

An advantageous example embodiment of the present invention includes: determining, upon reception of a reevaluation request, that the handover procedure associated with the radio terminal will be cancelled; and transmitting at least one cancel message.

Advantageously, unnecessary handovers are avoided and the resources for handover are efficiently used.

An aspect of the present invention is directed to the following subject matter: An apparatus comprising determining means to determine at least one conditional handover execution condition for conducting a conditional handover associated with a radio terminal; transmitting means (i.e., a transmitter) to transmit the at least one conditional handover condition; receiving means to receive a pre-trigger indication that indicates a probability of an expected future conditional handover that is associated with the at least one transmitted conditional handover condition.

DETAILED DESCRIPTION OF EXAMPLE EMBODIMENTS

Figure 1:
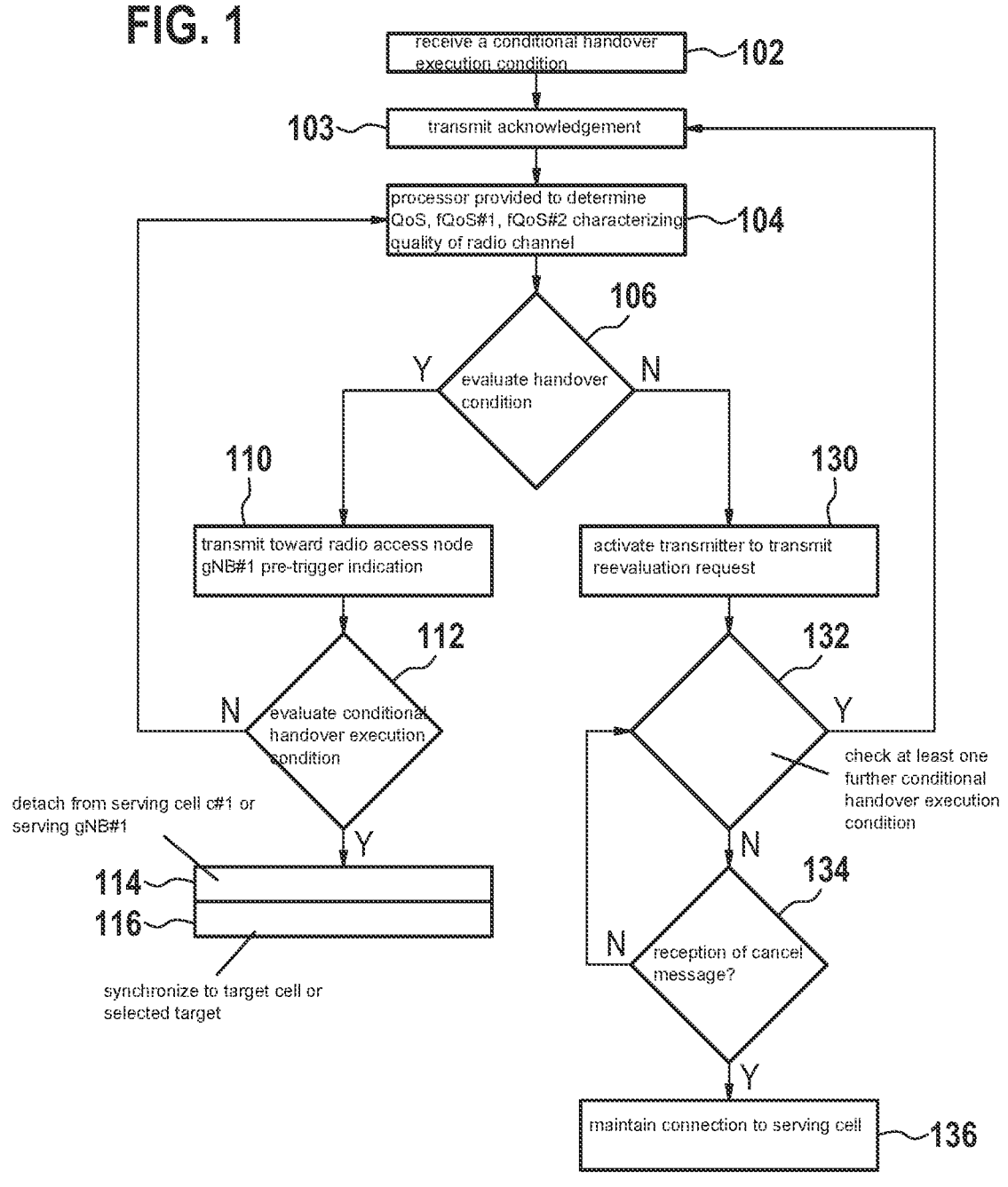
FIG. 1 schematically depicts a flow diagram for operating a radio terminal, according to an example embodiment of the present invention.

FIG. 1 depicts a schematic flow diagram for operating an apparatus UE #1, for example a radio terminal. Receiving means (i.e., received) 102 are provided to receive a one conditional handover execution condition HOc for conducting a conditional handover, for example via an RRC message. Transmitting means (i.e., transmitter) 103 are provided for transmitting an acknowledgement in response to the received conditional handover condition. Determining or processing means (i.e., processor) 104 are provided to determine a future QoS fQoS #1, fQoS #2 that characterizes a quality of a radio channel between a radio terminal UE #1 and a radio access node gNB #1, gNB #2 for a future time instant. Evaluating or processing means (i.e., processor) 106 are provided to evaluate the handover condition HOc based at least on the future QoS fQoS #1, fQoS #2.

Present and future QoS (Quality of Service) metrics to trigger a handover are: the reference signal received power (RSRP) and reference signal received quality (RSRQ). Where RSRP is a function of received RSSI and the associated reference signal power.

A channel estimation based on pilots is executed for every wireless transmission to invert the impact of the channel. Here, one leverages the fact that channel coefficients are correlated in time and frequency. This, autocorrelation is going to be utilized in this invention to improve the prediction also of more abstract features like the RSRP or the RSRQ as they depend on the characteristics of actual underlying physical wireless channel.

The determining or processing means 104 apply machine-learning methods to detect correlation in time, space and frequency without explicit knowledge of the underlying channel based on training data. In turn, a trainable function is created based on training data such as the RSRQ and RSRP value. The trainable function predicts the RSRQ or RSRP in the future.

The measurements in form of present QoS are reported to the serving radio access node gNB #from the UE #1 denoting a so-called measurement report. The future QoS is a machine learning based channel predictor that can be used to reduce the frequency of reporting measurements to the serving radio access node gNB #1. In turn, the signaling between base station and UE can be optimized.

Based on the proposed machine learning based prediction of the channel, the UE #1 can issue a notification to gNB #1 earlier and in advance to the occurrence of the handover execution indicating a severe channel degradation requiring counteractions by the network, i.e. a handover. Here, we target the problem in legacy and over that is that either the measurement report cannot reach the base station anymore as the channel is already degraded or hand over command cannot reach the UE again due to an unforeseen degradation of the channel. Especially this unexpected degradation can be identified by the machine learning based solution and therefore reduces the risk handover failure. The notification mechanism relies data-driven channel prediction.

For example, the UE #1 is configured to send an assisting report on demand, where the UE #1 sends a value indicating any/all of the following:

Prediction indicates needs for increasing the periodicity of periodic resources;

Prediction indicates the readiness of the assisting report (indicating a change to mobility management, possible interruption);

Prediction shows exceeding of one of the Handover events gNB confirmation;

schedule an urgent measurement report for the ready assisting report in the buffer;

Change the periodicity for a time T or until it is rescheduled.

The prediction of the handover allows to also predicting the handover interruption time. This prediction reduces the randomness in the duration of the handover disruption. In turn, the handover disruption becomes more deterministic. The deterministic and thus known interruption can assist higher layers to initiate dual connection or other redundancy schemes.

Different events trigger the apparatus UE #1 to send a measurement report to a serving radio access node gNB #1 requesting a handover to another cell. It is up to the base station/radio access node gNB #1 to interpret the event and initiate a conditional handover procedure. Among others, the following conditional handover conditions HOc are possible: handover condition A1: Serving cell becomes better than a threshold; handover condition A2: Serving cell becomes worse than threshold; handover condition A3: Neighbour cell becomes better than serving cell; handover condition A4: Neighbour cell becomes better than threshold; handover condition A5: Serving cell becomes worse than threshold 1 and neighbor becomes better than threshold 2 that are important for handover execution and/or cell reselection.

Transmitting means (i.e., transmitter) 110 transmit towards the serving radio access node gNB #1, if the evaluated handover condition HOc indicates an expected future conditional handover from a serving cell c #1 to a candidate cell c #2, a pre-trigger indication PTI that indicates at least a probability of the expected future conditional handover. For example, a single bit can also represent said probability of 100% or above 50%. In other examples, the PTI comprises a plurality of probabilities (for example in form of 1 or more bits), each one associated with a respective candidate cell for the conditional handover.

Evaluating or processing means 112 evaluate the conditional handover execution condition HOc based at least on a present QoS QoS #1, QoS #2. In other words, one or more present QoS in form of measurements or the like are used as an input to evaluate whether the conditional handover execution condition HOc is true—indicating a handover—or false—indicating no handover.

If the handover condition indicates a handover, detaching means 114 detach, upon the handover condition is met, from the serving cell c #1 or from the serving radio access node gNB #1, and synchronizing means 116 synchronize, upon the conditional handover execution condition HOc is met, to a target cell c #2 or the selected target qNB #2 associated with the conditional handover execution condition HOc that is met.

If the conditional handover execution condition HOc indicates no handover, the procedure continues with step 104, and the evaluating or processing means 106 evaluates the available handover condition with a recently determined future QoS. In other words, the evaluation means 106 determine, whether there is at least one favorable handover situation in the future.

Transmitting means 130 are activated to transmit to the serving radio access node gNB #1 a reevaluation request RR if the evaluated handover condition HOc indicates an unfavorable future handover situation, for example, if the evaluated handover condition HOc indicates that a future conditional handover from the serving cell c #1 to the candidate cell c #2 is not expected.

Receiving means 132 check, whether, from the serving radio access node gNB #1, as a response to the transmitted reevaluation request RR, at least one further conditional handover execution condition HOc for conducting a handover is received. If yes, then the determining means 104 determine at least one further future QoS fQoS #1, fQoS #2 for at least one further future time instant; the evaluating means 106 evaluate the at least one further handover condition HOc based at least on the at least one further future QoS fQoS #1, fQoS #2; and the transmitting means 110 transmit to the serving radio access node qNB #1 the pre-trigger indication PTI, if the evaluated at least one further handover condition HOc indicates an expected future conditional handover from a serving cell c #1 to at least one candidate cell c #2.

If receiving means (i.e., receiver) 134 determine whether there is a reception from the serving radio access node gNB #1 of at least one cancel message that indicates to cancel the present conditional handover, as a response to the transmitted reevaluation request RR. If yes, then maintaining means 136 maintains a connection to the serving cell c #1.

Figure 2:
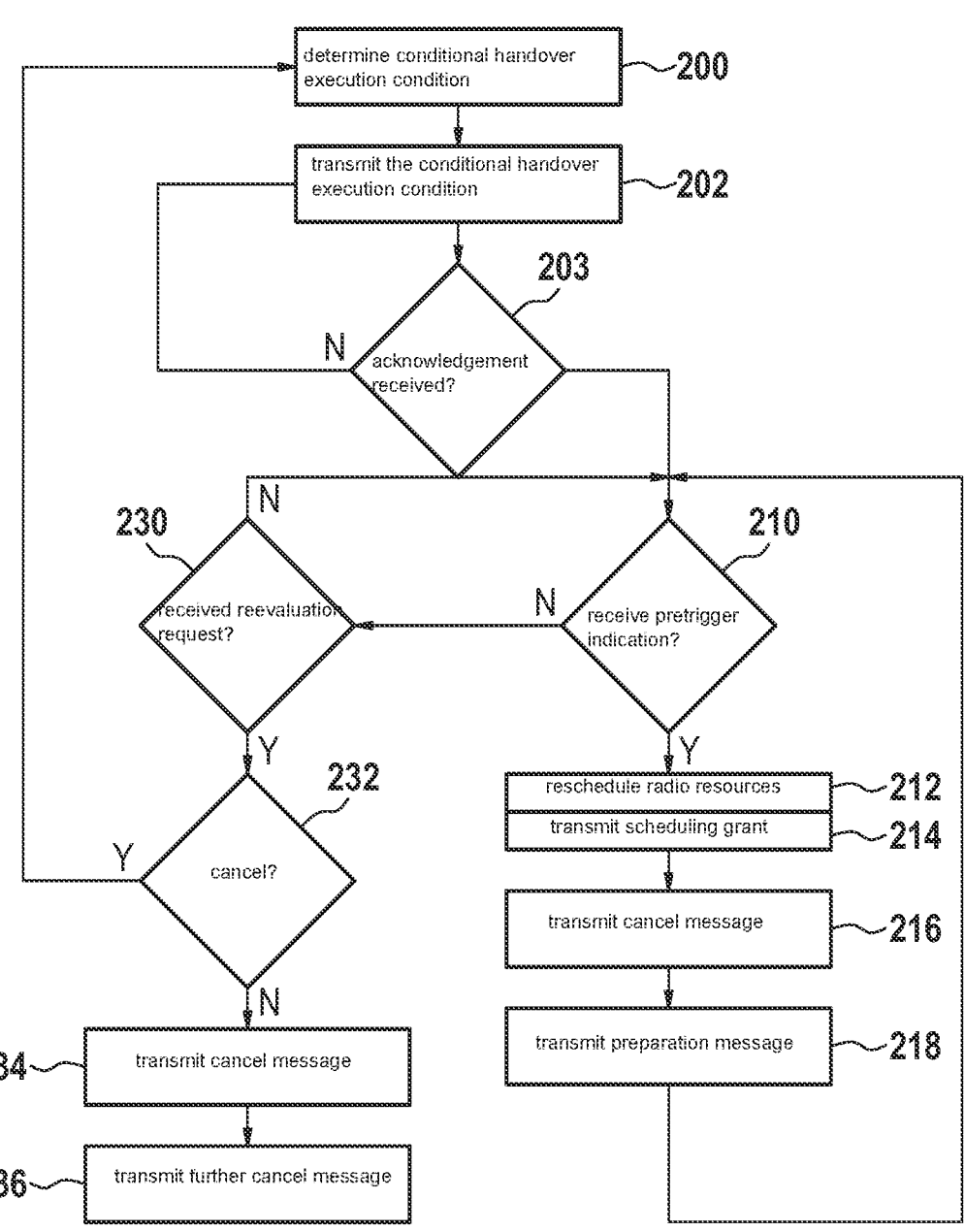
FIG. 2 schematically depicts a flow diagram for operating a radio access node of a radio access network, according to an example embodiment of the present invention.

FIG. 2 depicts a schematic flow diagram for operating an apparatus gNB #1, for example, a radio access node like a gNB. Determining means 200 are provided to determine at least one conditional handover execution condition HOc for conducting a conditional handover associated with the apparatus or radio terminal UE #1. Transmitting means 202 transmit the at least one conditional handover execution condition HOc towards UE #1. Expecting or monitoring means 203 expect or monitor for the reception of an acknowledgement for the transmitted at least one conditional handover. Receiving means 210 receive a pre-trigger indication PTI that indicates a probability of an expected future conditional handover that is associated with the at least one transmitted conditional handover condition.

Re-scheduling means 212 re-schedule, based on the received pre-trigger indication PTI, radio resources. Radio resources previously reserved for the handover can be released or scheduled and used by other terminals. Transmitting means 214 transmit towards the UE #1 a scheduling grant based on or comprising the re-scheduled radio resources.

Transmitting means 216 transmit towards UE #1, based on the received pre-trigger indication PTI a cancel message to at least one secondary candidate radio access node gNB #3 indicating a cancellation of the present potential conditional handover associated with the radio terminal UE #1 and the secondary candidate radio access node gNB #3.

Transmitting means 218 transmit towards UE #1, based on the received pre-trigger indication PTI a preparation message to at least one primary candidate radio access node gNB #2 indicating that the radio terminal UE #1 will probably initiate the conditional handover with the primary candidate radio access node gNB #2.

Upon reception means (i.e., receiver) 230 determine a reception of a reevaluation request RR, the determining means 200 determine at least one further conditional handover execution condition HOc for conducting a conditional handover associated with the radio terminal UE #1. Then the transmitting means 202 transmit towards UE #1 the at least one further conditional handover execution condition HOc.

Upon reception means 230 determine a reception of a reevaluation request RR, determining or processing means 232 determine that the handover procedure associated with the radio terminal UE #1 will be cancelled. Transmitting means 234 transmit towards UE #1 at least one cancel message in order to cancel the present handover procedure. Transmitting means 236 transmit towards gNB #2 at least one further cancel message in order to cancel the present handover procedure.

In legacy, the detection of a handover failure, handover trigger etc. relies on fix timers and counters (e.g. N310 or T310) which are left to UE implementation in LTE and 5G and cannot easily adapt to actual temporal and spatial dependencies of the channel. Utilizing the trainable channel predictor, handover trigger events can be identified in advance which allows for additional modification of the signaling procedure. In particular, the UE can send the pre-trigger indication PTI such that the base station can prepare for an upcoming handover.

In case of a conditional handover, the UE can also predict which conditions will be satisfied and when. Hence, the UE could signal its preferred handover candidate list to the base station and/or already signal the handover using the PTI. In turn, the data forwarding procedure can be optimized and the time in which all possible target cells are blocking resources for possible conditional handover can be reduced.

If UE is scheduled to perform configured grant transmission leveraging, the service interruption can be reduced as follows:

1. The UE informs the BS that configured slots will collide with a possible handover window
2. The BS can thus release the resources and serve other users.
3. The UE can now use the free resources to synchronize to the target cell instead of monitoring PDSCH of the source cell.

More precisely, the metrics to observe physical layer problems need to be re-evaluated by gNB/network if a UE triggers a Handover condition-reevaluation-request.

It this case, the UE may request handling/re-evaluating timers in the same request it sends to (re) evaluate the HO conditions. Thus, the request (L2 or RRC messages) includes:

Condition violation/adaption trigger (based on prediction)

Condition re-evaluation values:

If the network sends more than that value or the network requires a relation between the conditions, a UE may specify an alternative relation or values.

Times/phy-layer timers adaption or violation

In this case, UE may indicate a list of violated adapted times. Or the UE can have a time-reevaluation-request as separate message.

Likewise, the gNB can also adapt its behaviors. I.e., every time the UE sends the request, the UE may wait for a confirmation from the network if it is required. Required confirmation may be configured or indicated during initial association.

Considering the transmission of aperiodic deterministic traffic the UE can signal a PTI to the base station with the request to adjust the time slots for a configured grant. For example, the following options exist:

1) The transmission is prioritized to be finished before service interruption. The UE is prepared by the gNB (e.g., allowing more search space) to receive burst grant before "t". Hence, the UE is expected to increase BWP, monitor many occasions, receive other UE's grant as punctured data (i.e., with puncturing indication), etc.
2) Buffer/Delay: The transmission is delayed to transmit the data beyond the handover. The source and/or the target cell prepares the UE to receive burst data after switching to the new cell (i.e., t+HO). Hence, the UE may expect burst transmission via: increased BWP, monitor many occasions, receive other UE's grant as punctured data (i.e., with puncturing indication), etc.
3) Adjustment: In case of periodic transmission or deterministic aperiodic traffic, the transmission can be adjusted to allow transmission before and after the handover. If the UE is configured with configured resources (configured grants (CG) or SPS), or if the UE is configured with aggregated slots, the UE is signaled (before "t") to: Skip M periods, Relax periods after "t" and reduce it after "t+HO". Wherein the UE may join the new cell with the same CG/SPS RRC configuration with adaptation and change signaled in the downlink control information (DCI), e.g., frequency offset, periodicity, time-offset, etc.

According to an example, UE #1 predicts channel quality degradation in advance to initiate the handover procedure, where quality can be measured in reliability metrics (e.g., packet failures), channel signal degradation (e.g., RSSI and RSRP measurement value deterioration), or latency of packets, or number of re-transmissions, or not being able to receive grants with the packet delay budget, a Quality of Experience (QoE) satisfaction level, or any other measure/identifier of QoS.

According to an example, UE #1 predicts the handover trigger to establish a dual connection, for packet re-routing or packet duplication to reduce the throughput degradation and/or latency increase due to a possible handover failure. According to an example, UE #1 informs the data generating application to adjust the service based on predicted future available resources. For UL traffic: A cross layer parameter: need to be designed as follows: UL: With a threshold, if exceeded by a value, upper layer needs to reduce packet generation. UL: Therefore, the prediction indicates possible change in this value. For DL: The UE needs to signal this value to the network if it is expecting a DL traffic.

According to an example, UE #1 proactively informs the base station about possible channel degradations even if the trigger conditions are not met. UE #1 Generate a report for predicted handover measurements that comprises, for example, one or more of the following:

Switching/triggering time "t" (after which the UE expresses a dead-HO period "HO in FIG. 3))

Channel degradation vector/report, time vector,

The way-point in the report container, i.e., the limit or the number of the way points is factor of speed, message size, format, etc. and can be (pre-) configured.

the Triggering value and/or the triggering indication (high, low, critical, urgent, unsatisfied)

A Quality of Experience satisfaction level (or quantized to a (pre) configured levels, e.g., good, bad, satisfactory, etc.)

According to an example, UE #1 evaluates transmitted handover conditions and either inform the target cell, which condition will be met and when assists the BS to adapt the conditions to minimize handover actions. Conditional handover (re-) evaluation report triggering:

Direction UE->gNB (UL control channel, L2, L1)

Once a UE is configured or requested to predict HO, the UE performs pHO measurement comprises at least the values in the measurement report for pHO (comment above).

According to an example, UE #1 informs the base station/gNB to prioritize data of the UE as the QoS requirements will not be met if the data are delay due to a handover.

Handover degradation report (an on demand report, or periodic report). The HO degradation can also be included in Conditional-HO re-evaluation report (comment above). In both cases, the UE informs the gNB about degradation below a certain threshold after a time T. The possible container can be one or more of the following:

L1, UCI, triggering signal-1 bit (if degradation is requested separately), or

L2, MAC-CE, triggering value (based on threshold), time offset (if degradation is requested separately or within the Conditional handover (re-) evaluation report), or RRC message directed from UE to gNB.

Note: the BS can request Handover degradation report also via L1 triggering (e.g., in downlink control information (DCI)) in L2 signaling, e.g., MAC-CE, or other higher layers signaling, e.g., "RRC_request". The request can be Broadcasted to all UE, multi-casted to a group of UEs or unicasted to specific UE.

According to an example, the UE #1 can inform the base station to adapt the configured channels grants or future dynamic grants (e.g., burst or aggregated grants or (at least) a subsequent grant after L slots) to avoid signaling overhead, reduce handover interruption times and improve the overall quality of service.

Trigger an on demand CG/SPS adaptation request:

Possible skip periods and/or Time shift

Frequency resources needed after continuation

Periodicity adaptation

MCS reselection (before or after the switching event)

If multiple configured grants is used, the UE may send a specific on demand CG/SPS adaptation for each parallel/active configured grants.

According to an example, the UE #1 requests to reselect, release, some SPSs/CGs.

According to an example, the UE #1 autonomously selects MCS indicating it UL control information (if possible) or combining it with a pre-configured DRB (Data Radio Bearer) or using a pre-configured demodulated reference symbols (DMRS) pattern and/or time/frequency allocation.

Figure 3:
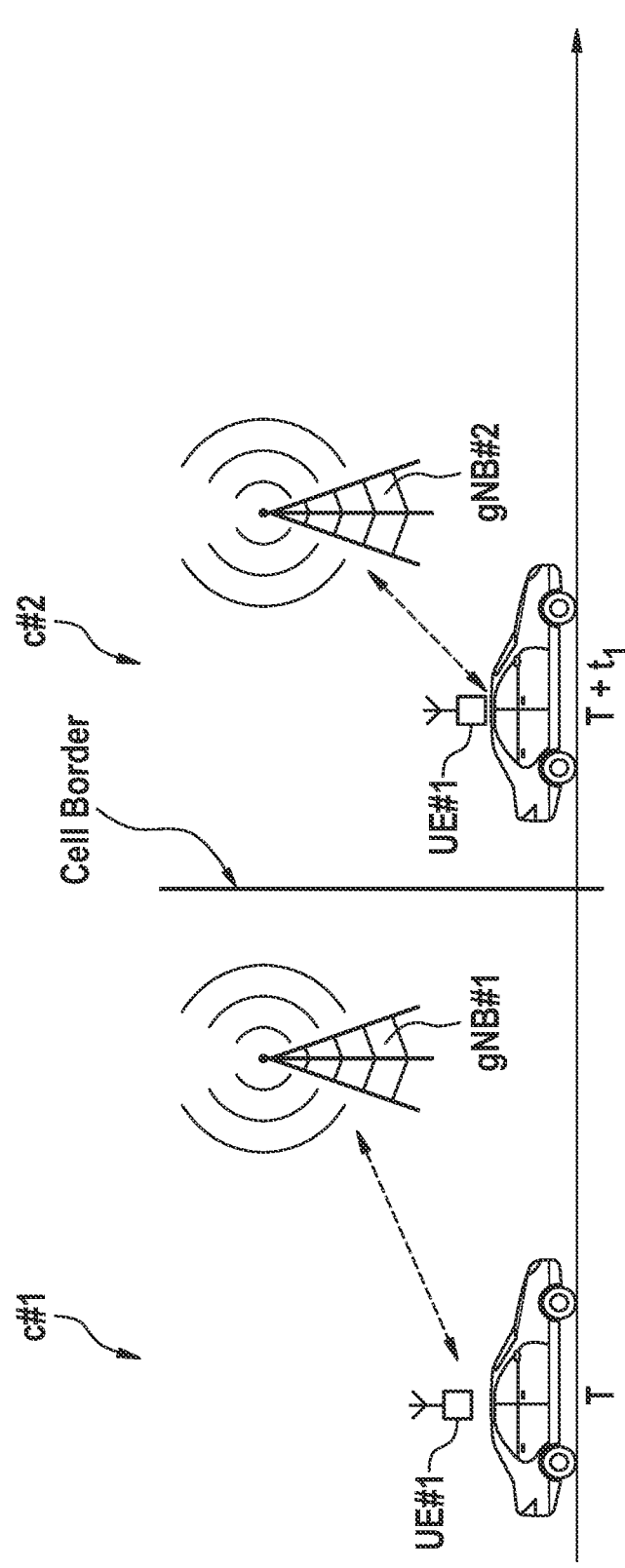
FIG. 3 depicts an exemplary radio situation that occurs when cars leave one serving cell and enter a candidate or target cell.

FIG. 3 depicts an exemplary radio situation that occurs when cars leave one serving cell c #1 and enter a candidate or target cell c #2. At point in time T, the serving radio access node gnB #1 serves the radio terminal UE #1. At point in time T+t_1, the serving radio access node has changed to gnB #2. Between the points in time T and T+t_1, the conditional handover occurs in order to maintain an uninterrupted connection of the radio terminal UE #1 to the radio access network. Of course, this situation also occurs in industrial context or other uses cases.

For 5th generation (5G) new radio (NR) communication, the network may comprise at least a next generation node base-station (gNB) and a set of user equipment (UE). The gNB is used for controlling or communicating data to some or all associated UEs via Uu interface. Inhere; the Uu interface represents the communication link between a gNB and another network UE terminal. The UE terminal may be an IoT device, an infrastructure (e.g., traffic lights, streetlights, etc.), an industrial automation component or infrastructure (e.g., robots, machines, etc.), a mobile broadband user, and/or a vehicle. Herewith, single vehicles may communicate to the gNB or multiple vehicles may comprise a group where one or more vehicles are communicating to the gNB, as well as to themselves. When UEs are communicating to themselves, a direct communication interface is used, namely PC5.

For Uu interface, two planes may be considered, the Uu User Plane (UP) for communicating data between the gNB (i.e., and the network) and the UE. The other plane may consider communicating control, i.e., control plane, between the two entities.

The control between the network and a UE may comprise, master information blocks (MIB), system information blocks (SIB), and radio resource control (RRC) dedicated configurations. Additionally, gNB may indicate resources (to be used) or instructions for communication via dedicated lower layer (layer 1/L1 and/or layer 2/L2) signaling. Control information for dedicated L1 or L2 signaling is indicated to one or more UEs via, e.g., dedicated L2 MAC control elements (MAC CE) or L1 downlink control information (DCI).

In general, a network is comprised of several gNBs serving UEs in a particular region, denoted as cell. Not only in the context of V2X applications, user mobility is a crucial feature of every modern wireless communication network to ensure connectivity is retained as the UE moves through then network. As the UE might leave the coverage of one gNB and moves into a neighboring cell, a handover or cell-reselection procedure is established. This is depicted in FIG. 2, where a UE approaches the cell border and has to connect to a neighboring target gNB to maintain the connection to the network and satisfy Quality of Service (QoS) requirements.

Generally, the UE can be in an idle, inactive or connected state. Based on the state of the UE different mobility mechanisms are used. In connected state network-controlled mobility is used, i.e., the network decides when to perform a handover based on measurements reported by the UE. Different types of handover exist, e.g.,:

intra-RAT handover, where source and target cells are part of the same RAT network inter-RAT handover, where source and target cells are part of different RAT networks of different operators and/or different countries also inter RAT handover, where a different radio access technology is used.

The network-controlled mobility relies heavily on the existing of timely measurement reports to avoid handover interruption or even radio link failure which would harm the quality of service.

If the UE is in idle or inactive mode, a cell reselection is performed and UE itself decides the best cell to camp on based on own measurements. Here a handover interruption cannot occur.

Figures 4, 5:
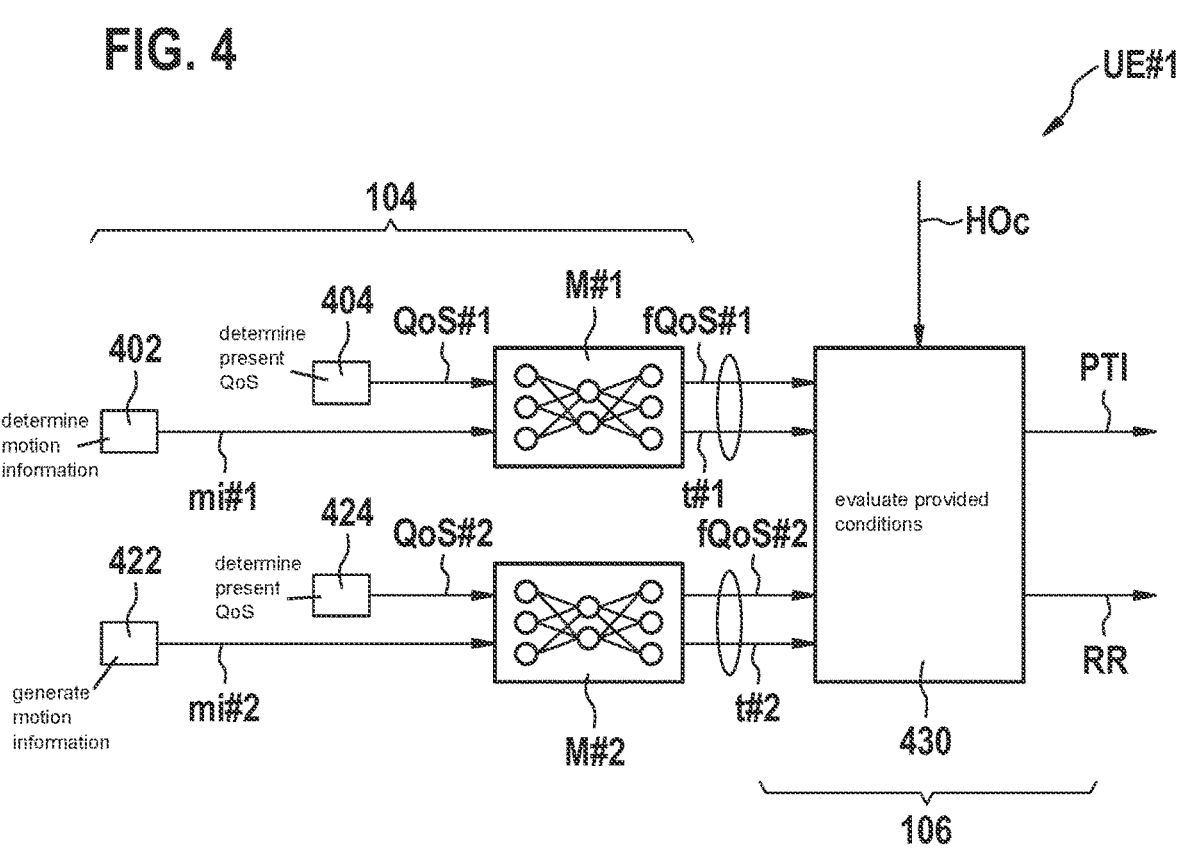
FIG. 4 depicts a schematic block diagram of a part of the radio terminal.
FIG. 5 depicts an exemplary format of a pre-trigger indication, according to an example embodiment of the present invention.

FIG. 4 depicts a schematic block diagram to generate the pre-trigger indication PTI and the reevaluation request RR by the apparatus UE #1.

For the serving cell c #1, a block 402 determines a motion information mi #1 that motion information mi #1 that characterizes a relative motion of the radio terminal UE #1 to the serving radio access node gNB #1. For example, the movement information mi #1 comprises a directed spatial vector that interconnects or associates spatial positions of the apparatus UE #1 in relation to the serving radio access node gNB #1 with time. For example, the block 402 receives, as an input, the spatial position of the serving radio access node gNB #1 and a plurality of waypoints with associated time instants representing the movement of UE #1.

For the serving cell c #1, a block 404 determines a present QoS QoS #1 that characterizes a quality of the radio channel between the radio terminal UE #1 and the serving radio access node gNB #1 for at least one present time instant.

A machine-trained model M #1, receives the present QoS QoS #1 and the motion information mi #1 as an input. The model M #1 provides the future QoS fQoS #1 associated with the serving cell c #1 as an output. According to an example, the model M #1 also provides the future time instant t #1 or a time window, for which the future QoS #1 is valid. In another example, the model M #1 provides pairs of QoS #1 and time instants t #1.

For the candidate cell c #2, a block 422 generates a motion information mi #2 that motion information mi #2 that characterizes a relative motion of the radio terminal UE #1 to the candidate radio access node gNB #2. For example, the movement information mi #2 comprises a directed spatial vector that interconnects or associates spatial positions of the apparatus UE #1 in relation to the candidate radio access node gNB #2 with time. For example, the block 4022 receives, as an input, the spatial position of the candidate radio access node gNB #2 and a plurality of waypoints with associated time instants representing the movement of UE #1.

Of course, further motion information for candidate radio access nodes can be determined in an analogous way.

For the candidate cell c #2, a block 424 determines a present QoS QoS #2 that characterizes a quality of the radio channel between the radio terminal UE #1 and the candidate radio access node gNB #2 for at least one present time instant.

A machine-trained model M #2, receives the present QoS QoS #2 and the motion information mi #2 as an input. The model M #2 provides the future QoS fQoS #2 associated with the candidate cell c #2 as an output. According to an example, the model M #2 also provides the future time instant t #2 or a time window, for which the future QoS #2 is valid. In another example, the model M #2 provides pairs of QoS #2 and time instants t #1.

For example, the machine-trained model M #1, M #2 is embodied as an artificial deep neural network comprising at least one or a plurality of hidden layers. In addition, convolutional deep neural networks can be used.

A block 430 receives one or more conditional handover conditions HOc and at least one of the fQoS #1 and fQoS #2. The provided conditions HOc are evaluated based on fQoS #1 and/or fQoS #2, depending on the condition, cf. above. If a handover is probable in the future, then PTI is generated. If there is identified an unfavorable situation for conducting a handover, RR is generated.

According to an example, the handover execution condition HOc comprises at least one handover event that compares both future QoS fQoS #1 and fQoS #2 which are associated with at least one future point in time. If the comparison results in a better QoS of the serving cell in the future than the candidate cell, then the execution condition HOc indicates a low expectance of the handover and a re-evaluation request RR is generated. If the comparison results in a better QoS for the candidate cell than for the serving cell in the future, then the PTI is transmitted. Of course, combinations of other handover events for a handover execution condition are feasible.

FIG. 5 depicts schematically a format for a pre-trigger indication PTI. There are provided entries comprising the cell identification, the probability of the handover and the associated time window.

Of course, as already indicated, the PTI can be only a single bit that is associated with a candidate cell. Also, other formats are possible.

Figure 6:
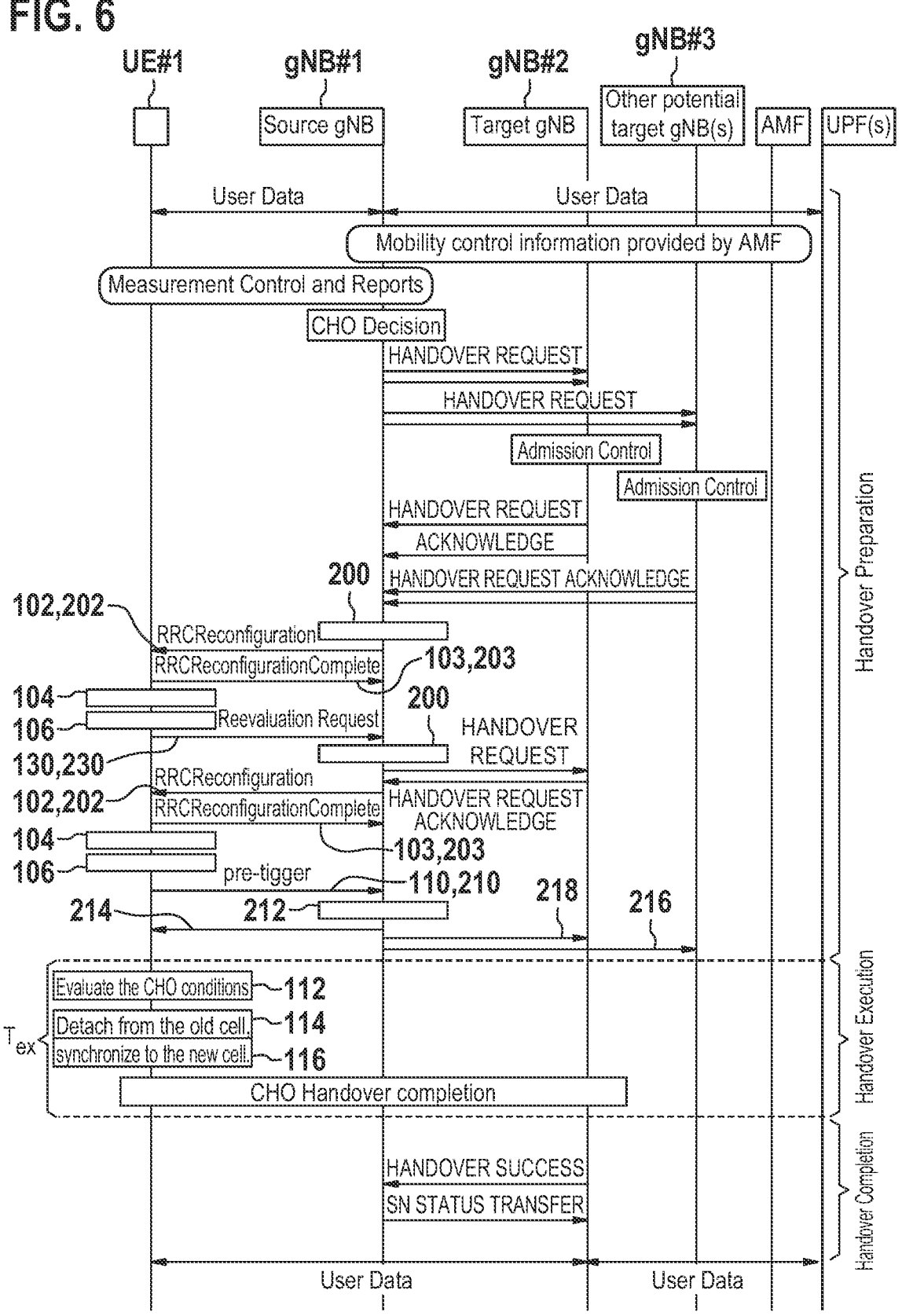
FIGS. 6 and 7 each schematically depict a handover procedure, according to an example embodiment of the present invention.

FIG. 6 depicts a sequence diagram wherein a conditional handover is executed. Reference is made to FIGS. 1 and 2. The Conditional Handover (CHO) is defined as a handover that is executed by UE #1 when one or more handover execution conditions are met. UE #1 starts evaluating the execution condition (s) upon receiving the CHO configuration based on present and future QoS #, fQoS #, and stops evaluating the execution condition (s) once a handover is executed or cancelled. The CHO configuration that is transmitted to the UE #1 contains the configuration of CHO candidate cell (s) generated by the candidate gNB (s) and execution condition (s) generated by the source gNB. An execution condition may consist of one or two trigger condition (s) or CHO events-here termed HOc. Before a CHO execution condition is satisfied, upon reception of HO command (without CHO configuration), the UE #1 executes the HO procedure regardless of a previously received CHO configuration. While executing CHO, i.e. from the time when the UE #1 starts synchronization with target cell, UE does not monitor source cell.

As in intra-NR RAN handover, in intra-NR RAN CHO, the preparation and execution phase of the conditional handover procedure is performed without involvement of the 5GC; i.e. preparation messages are directly exchanged between gNBs. The release of the resources at the source gNB during the conditional handover completion phase is triggered by the target qNB. The figure depicts the basic conditional handover scenario where neither the AMF nor the UPF changes After the source qNB #1 decides to use CHO, the source gNB #1 requests CHO for one or more candidate cells belonging to one or more candidate gNBs. A CHO request message is sent for each candidate cell.

The candidate gNB (s) gNB #2, gNB #3 sends CHO response (HO REQUEST ACKNOWLEDGE) including configuration of CHO candidate cell (s) to the source gNB #1. The CHO response message is sent for each candidate cell.

The source gNB #1 sends an RRCReconfiguration message to the UE #1, containing the configuration of CHO candidate cell (s) and CHO execution condition (s). The UE #1 sends an RRCReconfigurationComplete message to the source gNB. If early data forwarding is applied, the source gNB #1 sends the EARLY STATUS TRANSFER message.

The UE #1 maintains connection with the source gNB #1 after receiving CHO configuration, and starts evaluating the CHO execution conditions for the candidate cell (s).

After a first evaluation on the side of the UE #1, a reevaluation request is transmitted to the serving radio access node gNB #1. After providing new conditional handover conditions, UE #1 transmits a PTI indicating a probable handover at the time window T_ex.

If at least one CHO candidate cell satisfies the corresponding CHO execution condition in time windows T_ex, the UE #1 detaches from the source gNB, applies the stored corresponding configuration for that selected candidate cell, synchronizes to that candidate cell and completes the RRC handover procedure by sending RRCReconfigurationComplete message to the target gNB #2. The UE #1 releases stored CHO configurations after successful completion of RRC handover procedure.

The target gNB #2 sends the HANDOVER SUCCESS message to the source gNB #1 to inform that the UE has successfully accessed the target cell. In return, the source gNB #1 sends the SN STATUS TRANSFER message. Late data forwarding may be initiated as soon as the source gNB #1 receives the HANDOVER SUCCESS message.

The source gNB #1 sends the HANDOVER CANCEL message toward the other signaling connections or other candidate target gNBs, if any, to cancel CHO for the UE #1.

If late data forwarding is applied, the source NG-RAN node initiates data forwarding once it knows which target NG-RAN node the UE #1 has successfully accessed. If early data forwarding is applied instead, the source NG-RAN node initiates data forwarding before the UE #1 executes the handover, to a candidate target node of interest.

Figure 7:
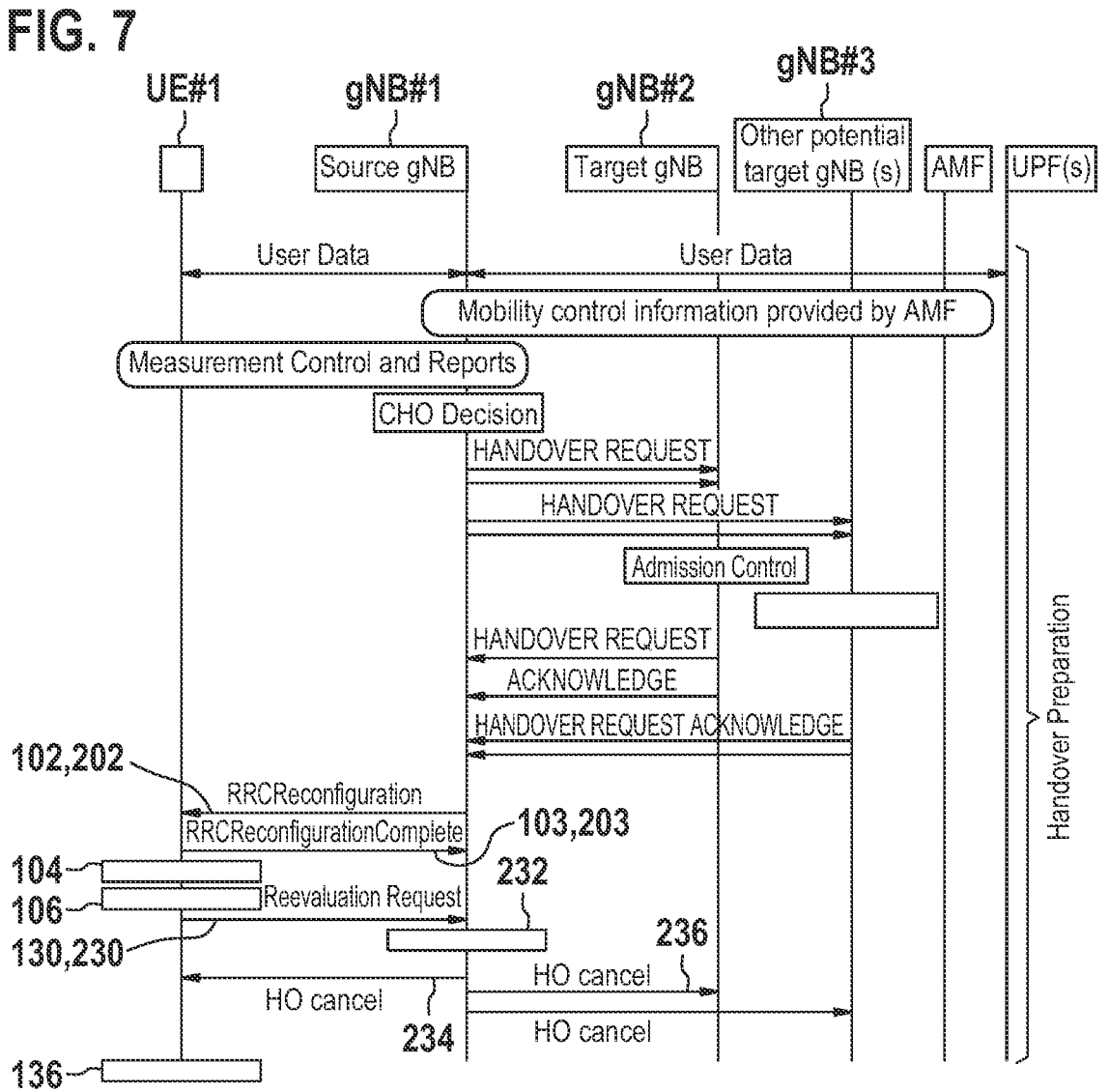

FIG. 7 depicts a sequence diagram where a conditional handover is cancelled. Reference is made to FIGS. 1 and 2. After a first evaluation on the side of the UE #1, a reevaluation request is transmitted to the serving radio access node gNB #1, which decides to cancel the present handover procedure omitting the handover execution.

What is claimed is:

1. A method comprising:
receiving at least one handover condition for conducting a handover;
determining at least one future QoS that characterizes a quality of at least one radio channel between a radio terminal and a radio access node for at least one future time instant;
evaluating the at least one handover condition based at least on the at least one future QoS; and
transmitting a reevaluation request when the at least one evaluated handover condition indicates an unfavorable future handover situation.

2. The method according to claim 1, further comprising:
transmitting, when the at least one evaluated handover condition indicates an expected future handover from a serving cell to at least one candidate cell, a pre-trigger indication that indicates at least a probability of the expected future handover.

3. The method according to claim 1, further comprising:
receiving, as a response to the transmitted reevaluation request, at least one further handover condition for conducting a handover;
determining at least one further future QoS for at least one further future time instant;
evaluating the at least one further handover condition based at least on the at least one further future QoS; and
transmitting, when the at least one evaluated further handover condition indicates an expected future handover from a serving cell to at least one candidate cell, a pre-trigger indication.

4. The method according to claim 1, further comprising:
receiving, as a response to the transmitted reevaluation request, at least one cancel message that indicates to cancel a present handover; and
maintaining a connection to the serving cell upon reception of the cancel message.

5. The method according to claim 1, further comprising:
evaluating the at least one handover condition based at least on at least one present QoS;
detaching, upon the at least one handover condition being met, from the serving cell; and
synchronizing, upon the at least one handover condition being met, to a target cell associated with the at least one handover condition that is met.

6. The method according to claim 1, wherein the determining of the at least one future QoS includes: determining the at least one future QoS associated with the serving cell, using at least one machine-trained model, wherein at least one present QoS that characterizes a quality of the at least one radio channel between the radio terminal and the serving radio access node for at least one present time instant and at least one motion information that characterizes a relative motion of the radio terminal to the serving radio access node is provided as an input of the at least one machine trained model, and wherein the at least one future QoS associated with the serving cell is provided as an output of the at least one machine trained model.

7. The method according to claim 1, wherein the determining of the at least one future QoS includes: determining the at least one future QoS associated with a candidate cell, using at least one machine-trained model, wherein at least one present QoS of the candidate cell that characterizes a quality of the at least one radio channel between the radio terminal and a candidate radio access node for at least one present time instant and at least one motion information that characterizes a relative motion of the radio terminal to the candidate radio access node is provided as an input of the at least one machine trained model, and wherein the at least one future QoS associated with the candidate cell is provided as an output of the at least one machine trained model.

8. An apparatus, comprising:

a receiver configured to receive at least one handover condition for conducting a handover;

a determining device configured to determine at least one future QoS that characterizes a quality of at least one radio channel between a radio terminal and a radio access node for at least one future time instant;

an evaluator configured to evaluate the at least one handover condition based at least on the at least one future QoS; and a transmitter configured to transmit a reevaluation request when the at least one evaluated handover condition indicates an unfavorable future handover situation.

9. A method comprising:

determining at least one handover condition for conducting a handover associated with a radio terminal;

transmitting the at least one handover condition;

receiving a pre-trigger indication that indicates a probability of an expected future handover that is associated with the at least one transmitted handover condition;

re-scheduling, based on the received pre-trigger indication, radio resources; and transmitting a scheduling grant based on the re-scheduled radio resources.

10. The method according to claim 9, further comprising:

transmitting, based on the received pre-trigger indication, a preparation message to at least one primary candidate radio access node indicating that the radio terminal will probably initiate the handover with the primary candidate radio access node.

11. The method according to claim 9, further comprising:

transmitting, based on the received pre-trigger indication, a cancel message to at least one secondary candidate radio access node indicating a cancellation of a present potential handover associated with the radio terminal and the secondary candidate radio access node.

12. A method comprising:

determining at least one handover condition for conducting a handover associated with a radio terminal;

transmitting the at least one handover condition;

receiving a pre-trigger indication that indicates a probability of an expected future handover that is associated with the at least one transmitted handover condition;

determining, upon reception of a reevaluation request, at least one further handover condition for conducting a conditional handover associated with the radio terminal; and transmitting the at least one further handover condition.

13. A method comprising:

determining at least one handover condition for conducting a handover associated with a radio terminal;

transmitting the at least one handover condition;

receiving a pre-trigger indication that indicates a probability of an expected future handover that is associated with the at least one transmitted handover condition;

determining, upon reception of a reevaluation request, that the handover procedure associated with the radio terminal will be cancelled; and transmitting at least one cancel message.

14. An apparatus, comprising:

a determination device configured to determine at least one handover condition for conducting a handover associated with a radio terminal;

a transmitter configured to transmit the at least one handover condition;

a receiver configured to receive a pre-trigger indication that indicates a probability of an expected future handover that is associated with the at least one transmitted conditional handover condition; and a further transmitter configured to transmit a scheduling grant determined from a re-scheduling of radio resources based on the received pre-trigger indication.

* * * * *